Nov. 6, 1945.   E. E. BIDWELL   2,388,248
FLUID METER
Filed March 25, 1942   3 Sheets-Sheet 1

INVENTOR.
EARL E. BIDWELL
BY
ATTORNEY.

Nov. 6, 1945.  E. E. BIDWELL  2,388,248
FLUID METER
Filed March 25, 1942  3 Sheets-Sheet 2

INVENTOR.
EARL E. BIDWELL
BY
ATTORNEY.

Nov. 6, 1945.   E. E. BIDWELL   2,388,248
FLUID METER
Filed March 25, 1942   3 Sheets-Sheet 3

INVENTOR.
EARL E. BIDWELL
BY
ATTORNEY.

Patented Nov. 6, 1945

2,388,248

UNITED STATES PATENT OFFICE 2,388,248

FLUID METER

Earl E. Bidwell, San Diego, Calif., assignor to Walter P. Innes, Jr., Wichita, Kans.

Application March 25, 1942, Serial No. 436,147

7 Claims. (Cl. 201—48)

This invention relates to fluid gauges, and more particularly to gauges used for indicating at a remote point the volume of liquid in a container or the rate of flow of a liquid in a conduit.

An object of the present invention is to provide a fluid gauge wherein a mechanically movable element is sensitive to fluctuations of the liquid being measured, such sensitivity being made manifest through the expedient of a variable resistance operably coupled to the movable element in such a manner as to cause variations in the current of the circuit of which the variable resistance is a part.

A more detailed object is the provision of a variable resistance particularly adapted for, but not necessarily limited to, use as a part of the fluid gauge of the present invention, since it is substantially frictionless and consequently offers a minimum of mechanical resistance to its own actuation, thereby contributing substantially to the sensitivity and accuracy of the instrument.

Another object in this connection is to provide a variable resistance in which the movable contact element is practically devoid of friction, thereby ensuring ease of operation and elimination of wear, and yet which is substantially a "dead beat" instrument inasmuch as it is provided with means for damping movement thereof and thereby minimizing oscillation past the position to which it is being urged.

A further object of my invention is to provide, as a modified form of fluid gauge, an improved and simplified design of flow meter, i. e., a fluid gauge sensitive to flow of fluid and to an extent proportional to the rate thereof, with the result that the instrument finds particular utility upon modern aircraft where a knowledge of the rate at which fuel is being consumed is a valuable aid to efficient navigation.

Simplicity of construction, with the consequent reliability of operation and economy of manufacture, as well as facility of installation, inspection, and repair, are further considerations of importance which have influenced the design of the fluid gauge of the present invention.

The invention presents other objects and valuable features, some of which, with those enumerated, will be set forth in the following description of the preferred embodiments of my invention illustrated in the drawings accompanying and forming part of the specification. It is to be understood that I do not limit myself to the showing made by the said drawings and description, as I may adopt variations of the preferred embodiments without departing from the scope of the invention as defined by the claims.

Referring to drawings.

Figure 1:
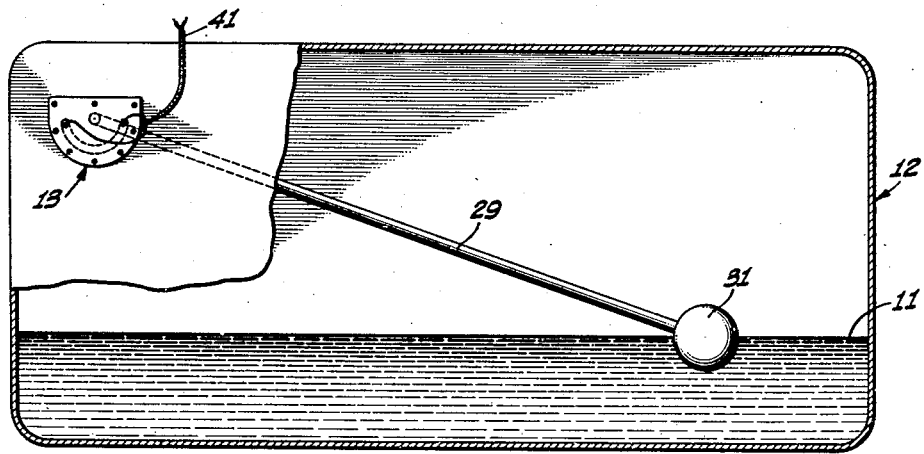
Figure 1 is a view in side elevation of a fuel depth gauge incorporating the principles of the present invention, co-operatively installed upon a side of a gasoline tank, portions of which are broken away and shown in section to show the manner in which the float operates.
Figures 2, 3, 4:
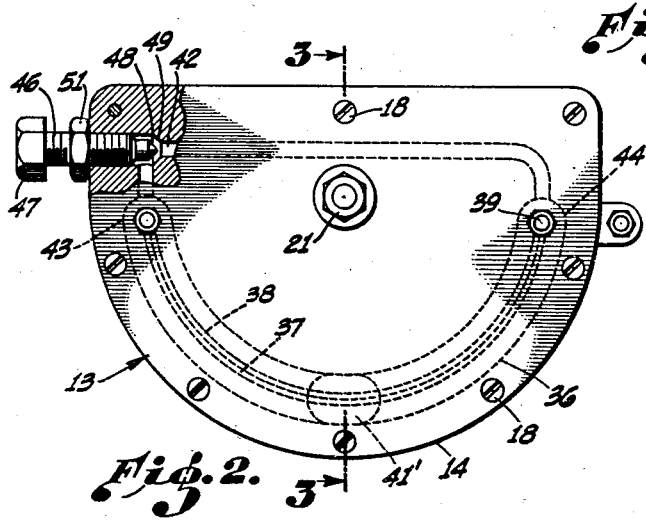
Figure 2 is an enlarged view in side elevation of the depth gauge of Figure 1. Portions of the figure are broken away and shown in section the better to reveal details of construction.
Figure 3 is vertical, medial sectional view, the plane of section being indicated by the line 3—3 of Figure 2 and the direction of view by the arrows.
Figure 4 is a perspective view of the depth gauge of Figures 1, 2, and 3, partially broken away and shown in section, the better to reveal its detailed construction.

Referring first to that modification of my invention which is illustrated in Figures 1 to 4 inclusive, the fluid gauge there illustrated is designed to operate as a depth gauge useful in measuring the quantity of fuel 11 remaining within a tank 12. It is adapted to actuate a suitable indicating device (not shown) which may be mounted in any convenient location and at a point remote from the tank 12 if desired, as for example upon the instrument panel of the automobile, aircraft or the like, the fuel for which is carried in the tank 12. The gauge, which is indicated in its entirety at 13, comprises a housing 14 of substantially semi-circular form, as clearly shown in Figures 1 and 2, and composed of any suitable insulation material. Many of the modern plastics have proven ideal for this use. Preferably the housing 14 is of two parts 16 and 17 releasably secured to each other as by a plurality of screws 18.

The housing 14 is mounted for rocking movement outside the tank 12 and preferably upon one of the side walls thereof. For this purpose the housing 14 is carried by an actuating rod 19. A nut 21 on the end of the rod 19 compresses the housing 14 between itself and a washer 22 which engages a shoulder 23 on the rod 19, which extends through a stuffing box 24 formed upon a wall of the tank 12 and contains suitable packing 26 compressed around the rod 19 as by a gland nut 27, thus insuring the joint against leakage. Within the tank 12 the rod 19 is bent to an angle of approximately 90° with respect to that portion 28 thereof which carries the housing 14. Whereas the portion 28 is disposed substantially horizontally, the portion 29 which is at right angles therewith and which is disposed inside the tank 12, is preferably of considerable length and carries upon its extreme end a suitable float 31. Since the portion 29 of the rod 19 extends laterally from its horizontal portion 28, the float 31 will cause the rod to swing above the axis of the portion 28 thereof as the level of the fuel 11 within the tank 12 varies; and since the housing 14 is rigidly affixed to the portion 28, the housing also will be caused to rotate as the float 31 moves upwards or downwards.

Within the housing 14 an arcuate passageway 36 is formed. Preferably half of the passageway 36 is formed in each of the sections 16, 17 of housing 14 and in registering portions of the inner faces thereof, so that when the portions 16 and 17 are brought together the two halves of the passageway 36 co-operate to define the arcuate passageway, as clearly shown in Figures 3 and 4. Extending longitudinally of the passageway 36 and in opposite walls thereof, are a pair of spaced, parallel conductors 37 and 38. Preferably these conductors are mounted by being imbedded within the material of which the housing 14 is formed but only so far as to leave at least a face of each conductor exposed within the passageway 36. Either or both of the conductors 37, 38 may be a suitable resistance element; in the modification illustrated the conductor 38 is a resistant coil, whereas the conductor 37 is a rod or wire of suitable conductive material. Each of the conductors 37, 38 is connected at one of its ends to a suitable terminal or binding post 39 which facilitates connecting wires 41 thereto in such a manner as to include the conductors 37 and 38 within an electric circuit. However, these two conductors are spaced apart throughout their entire length but are adjustably interconnected in such a manner as to complete the electric circuit by means which are movable longitudinally of the passageway 36 so as to effect variations in the effective length of the conductors 37 and 38 which are included in that circuit. In order to insure efficient electrical conductivity of this connecting means, as well as to minimize the frictional resistance which might otherwise tend to hamper movement of the connecting means longitudinally of the passageway, the form of connecting means which I have selected is a drop or globule 41 of mercury. In this connection it should be noted that the word "drop" is used not in a technical sense but merely to indicate a small quantity of indeterminate volume. Very probably a single drop of mercury would not be sufficient inasmuch as it is desirable to employ enough to fill that portion of passageway 36 within which the mercury is disposed at any one time. Accordingly, as the drop 41 moves longitudinally of the passageway, air which is entrapped within the passageway cannot move past the drop itself but will be caused to move along with the drop for a purpose which will be explained in greater detail hereinbelow.

Due to the extreme liquid nature of the mercury, it will always remain within the lower portion of the passageway 36 regardless of the position to which the housing 14 is swung. It is apparent therefore that a certain portion of the resistance 38 will be connected to the corresponding portion of the conductor 37, those portions being appropriate to a certain level of the fuel 11 and to that level only. Accordingly, the electrical resistance of the circuit of which the conductors 37 and 38 are a part is caused to be varied as the level of the fuel 11 within the tank 12 fluctuates; and, by employing a suitable indicating instrument the extent of such fluctuation can be made readily legible at a remote point, as will be readily understood.

Means are provided for damping movements of the drop 41 longitudinally of the passageway, this means being so arranged as to permit movement to the actual position which is appropriate to the level of the fuel 11 at that time, but at a relatively slow rate. The reason for employing such damping means is twofold: first, to prevent the instrument from becoming sensitive to those relatively rapid fluctuations of the level of the fuel which results from the splashing or sloshing of the fuel within the tank coincident with movement of the supporting vehicle; and, second, to make the instrument practically "dead beat," i. e. to prevent oscillation of the needle or corresponding portion of the indicating instrument back and forth past the actual position which the indicating device should occupy. As hereinabove stated, the drop of mercury is large enough to seal the associated portion of the passageway 36, with the result that air entrapped within the passageway cannot flow past the drop 41. Accordingly, as the drop 41 moves longitudinally of the passageway 36, the entrapped air is caused to flow through a by-pass 42 which interconnects opposite ends 43 and 44 of the passageway 36 within which the conductors 37 and 38 are disposed. Associated with the by-pass 42 is a needle valve 46, the head 47 of which is easily accessible exteriorly of the housing 14 to facilitate adjustment. The point 48 of the needle valve is co-operatively associated with the valve seat 49 and may be locked at a selected distance from the seat 49 by means of a lock nut 51 so as to determine accurately the rate at which air will be permitted to flow through the by-pass 42 and consequently determine the maximum rate at which the drop 41 of mercury will be permitted to move longitudinally of the passageway 36.

Figure 5:
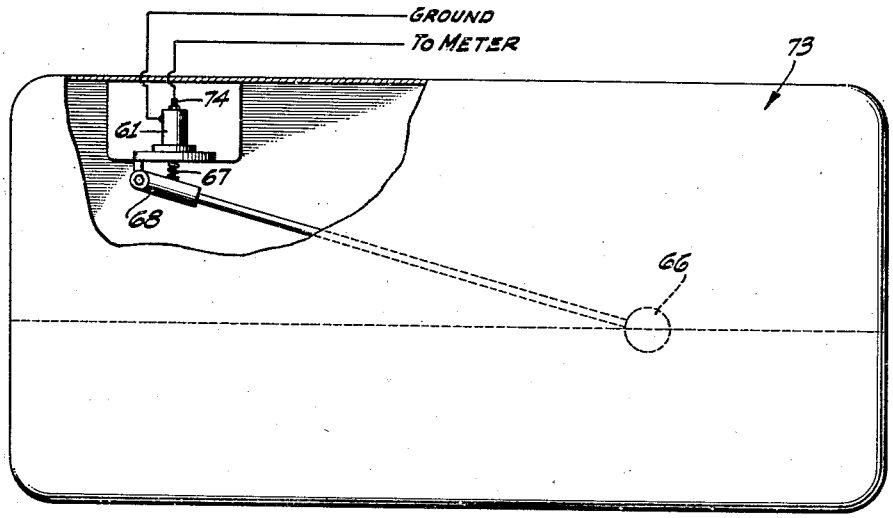
Figure 5 is a view similar to Figure 1, illustrating a modified form of test gauge.
Figure 6:
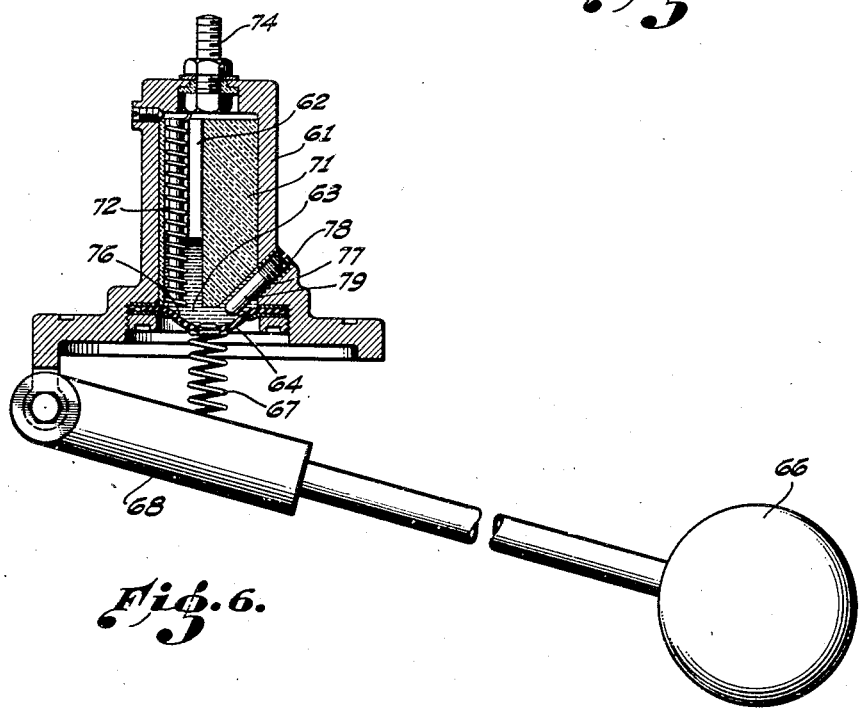
Figure 6 is an enlarged view in vertical, medial section of the depth gauge of Figure 5 with the float therefor illustrated in side elevation. Portions of the figure are broken away to reduce its length.
Figure 7:
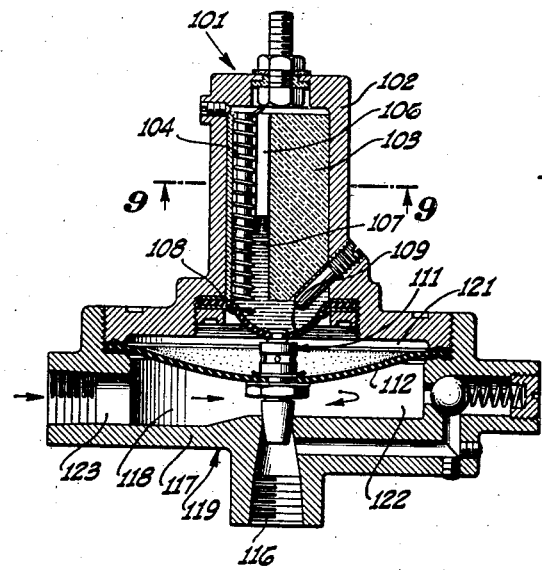
Figure 7 is a view in vertical, medial section of another modified form of fluid gauge incorporating the principles of the present invention. This modification is designed to operate as a flow meter, i. e., to indicate the rate of flow of a fluid through a conduit.
Figure 9:
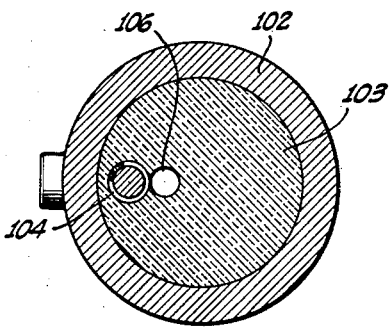
Figure 9 is an enlarged, horizontal sectional view, the plane of section being indicated by the line 9—9 of Figure 7 and direction of view by the arrows.

Figures 5 and 6 illustrate a slightly modified form of depth gauge, the housing 61 of which contains a vertically disposed, straight passageway 62 leading upward from a reservoir 63, the bottom of which is closed by a flexible diaphragm 64 which is adapted to be pressed upwards a distance proportionate to the upward movement of the float 66 through the expedient of a coil spring 67 under compression between the diaphragm 64 and the arm 68 upon which the float 66 is mounted. Preferably the passageway 62 is in a block 71 of insulative material which fits within the hollow interior of the housing 61. A resistance coil 72 of suitable conductive material and characterized by a known electrical resistance, is mounted in the block 71 of insulative material in such a manner that it is either wholly or partially exposed throughout its entire length to the passageway 62. Preferably the housing 61 is of suitable electrically conductive material such as brass, and is mounted in such a manner on the fuel tank 73 that it is electrically grounded thereupon. The upper end of the coil 72 is connected to a terminal or binding post 74 which is carried by, but is insulated from, the housing 61. Consequently, the measuring device is adapted to be electrically connected into a suitable electrical circuit the resistance of which is adapted to be varied proportionally with the distance to which mercury 76 is forced upwards from the reservoir 63 into the passageway 62. As hereinabove explained, the capacity of the reservoir 63 is adapted to be varied proportionally with movement of the float 66 and its arm 68. In other words, as the float 66 rises, the mercury is forced upwards within the passageway 62, thereby decreasing the length of the coil 72 of resistance material through which the current of the circuit must flow.

Means preferably are provided for calibrating or for zeroizing the instrument. The housing 61 is provided with a port 77 through which the mercury 76 can be poured to fill the reservoir 63. This port 77 is threaded to receive a plug 78 the inner end of which carries an extension 79 reaching down towards the reservoir 63, with the result that as the plug 78 is screwed further into the housing the further the mercury 76 will be forced upwards within the passageway 62. The plug 78 therefore provides means whereby the needle of the indicating instrument can be brought accurately to its zero-reading position when the tank 73 is empty.

The fluid meter illustrated in Figures 7 to 10, inclusive, constitutes a further modified form of my invention inasmuch as it is so designed that it is sensitive to fluctuations in the rate of flow instead of being sensitive to variations in volume as in the case of the previously described modifications. In its preferred form it is provided with a variable electrical resistance 101 similar to that of Figures 5 and 6 and similarly contained within a housing 102 of electrically conductive material. The housing contains a core 103 of insulative material, and a resistance coil 104 exposed at one side and throughout its entire length to a passageway 106 within which mercury 107 is adapted to be forced upwards from a reservoir 108 adjacent the bottom of the housing 102 when a diaphragm 109 which closes the bottom of the reservoir within which the mercury 108 is stored, is forced upwards. In this modification, however, the means for effecting movement of the diaphragm 109 takes the form of a plunger 111 which is connected to an actuating diaphragm 112 to be moved thereby as the diaphragm itself moves. The plunger 111 is also carried by, and may be formed integral with, a valve 113 which is cooperatively associated with a valve seat 114 which communicates with an outlet port 116 which leads outwards from the bottom 117 of the chamber 118 formed at the bottom of the housing 102 by means of a preferably removable lower head 119. Whereas the diaphragm 112 extends across the chamber 118, thus dividing it into upper and lower portions 121 and 122 respectively, both the outlet port 116 and an inlet port 123 communicate with the chamber 118 on the same side of the diaphragm 112, to wit: they both communicate with the lower portion 122 of the chamber 118. The plunger 111 extends completely through the diaphragm 112 so that its upper end can make actuating contact with a button or saddle 126 secured to the upper diaphragm 109 preferably at the center thereof. Preferably this saddle 126 is provided with a pin 127 resting within a substantially complementary socket 128 in the upper end of the plunger 111, to retain the two parts in axial alignment.

Figure 8:
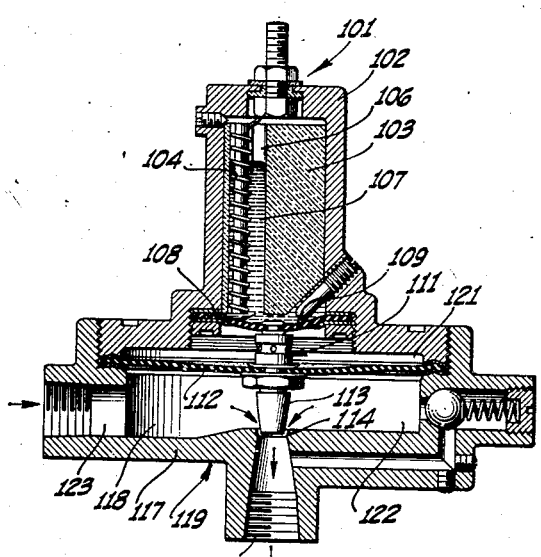
Figure 8 is a view similar to Figure 7, but showing parts of the instrument in the respective positions assumed thereby while the flow is taking place at a relatively rapid rate.
Figure 10:
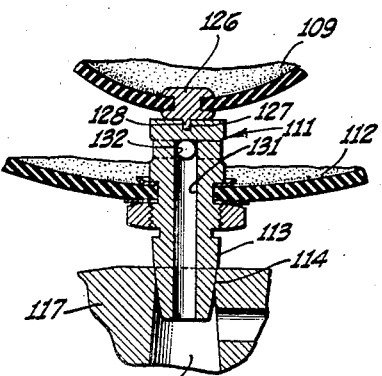
Figure 10 is an enlarged scale view of the valve upon movement of which operation of the flow meter of Figures 7, 8, and 9 depends. This view is in vertical medial section.

In order to maintain the pressure within the upper portion 121 of the chamber 118 the same as that which prevails within the outlet port 116, and whatever conduit (not shown) leads therefrom, I have formed the plunger 111 with an axial passageway 131 which communicates through the valve 113 with the outlet port 116. Preferably a plurality of laterally extending openings 132 establish communication between the upper end of the passageway 131 and the upper portion 121 of the chamber 118. Consequently, when the pressure within the outlet port 116 is lowered, as, for example, when the engine to the carburetor to which the port 116 is connected, commences operation and thus creates a partial vacuum upon its fuel line, the pressure within the upper portion 121 of the chamber 118 is correspondingly reduced. The pressure within the lower portion 122 of the chamber 118 will remain substantially constant, due, for example, to the operation of a suitable fuel pump or gravity feed; consequently, the reduction in pressure above the diaphragm 112 will permit the pressure against the under surface of the diaphragm to lift the diaphragm, thereby raising the valve 113 out of its sealing engagement with the seat 114, as indicated in Figure 8, and permitting fuel to run through the port 116 at a rate which is proportional to the distance that the diaphragm 112 has been raised. It should be observed, therefore, that the upper diaphragm 109 is moved through the same distance as that through which the lower diaphragm 112 moves because of the contact between the plunger 111 and the saddle 126 of the upper diaphragm 109. Consequently, when the lower, actuating diaphragm 112 moves upwards, mercury 108 is forced upward in the passageway 106 a distance proportional to the extent of movement of the lower diaphragm 112 and the valve 113 carried thereby, with the result that by employing suitable calibration upon the indicating instrument with which the resistance element 104 is associated, a direct reading can be secured of the rate at which fuel is flowing through the gauge. Preferably both diaphragms 109 and 112 are composed of highly flexible material which, however, is resistant to the liquid apt to be passed through the gauge. For example, if the gauge is to be used for gasoline it is desired that the diaphragm be composed of the synthetic rubber known in the trade as "Neoprene" because of its characteristic of high resistance to gasoline and the like.

An important consideration of the structure illustrated is that the upper diaphragm 109 is of considerably smaller area than the lower diaphragm 112 and, therefore, any pressure within the upper portion 121 of the chamber 118 will have much less influence upon the upper diaphragm than upon the lower. Furthermore, any influence which such pressure might have upon the position of the mercury 107 within the passageway 102 because of movement of the diaphragm 108 through the influence of pressure in the upper portion of the chamber, may be compensated for in the calibration of the indicating instrument.

I claim:

1. In a variable electric resistance device of the character described, a housing having an elongated passageway therein, a pair of conductors disposed in spaced relation and extending longitudinally of said passageway, a drop of electrically conductive liquid within said passageway and contacting both of said conductors, said drop being movable along said passageway and establishing an hermetic seal with the walls thereof to entrap air between said drop and an end of said passageway, and a needle valve communicating with said end of said passageway regulable to determine the rate of flow or air into and out of said passageway and thereby damp movements of said conductive fluid within said passageway.

2. In a variable electric resistance device of the character described, a housing having an elongated passagway therein, a pair of conductors disposed in spaced relation and extending longitudinally of said passageway, a quantity of electrically conductive liquid within said passageway and contacting both of said conductors, said quantity being movable along said passageway and establishing an hermetic seal with the walls thereof to entrap air between said quantity and an end of said passageway, and a needle valve communicating with said end of said passageway and regulable to determine the rate of flow of air into and out of said passageway and thereby damp movements of said conductive liquid within said passageway, said needle valve leading to the atmosphere whereby the pressure on the outer side of said needle valve remains substantially constant throughout the entire range of movement of said conductive liquid.

3. In a gauge for fluid, a housing having an elongated passageway therein, a pair of conductors disposed in spaced relation and extending longitudinally of said passageway, a quantity of electrically conductive liquid within said passageway and contacting both of said conductors, means sensitive to fluctuations of the mean level of said fluid and movable proportionally with the extent thereof for effecting movement of said drop along said passageway, means providing a by-pass interconnecting the ends of said passageway on opposite sides of said quantity of liquid, and means for restricting flow through said by-pass to damp movements of said quantity within said passageway.

4. In a gauge for fluid, a housing having an elongated passageway therein, a pair of conductors disposed in spaced relation and extending longitudinally of said passageway, a drop of electrically conductive liquid within said passageway and contacting both of said conductors, means sensitive to fluctuation of the mean level of said fluid and movable proportionally with the extent thereof for effecting movement of said drop along said passageway, said drop filling the associated portion of said passageway and making an hermetic seal with the walls thereof to entrap air between an end of said passageway and said drop, and means for damping movement of said drop within said passageway, comprising means presenting a restricted orifice establishing communication between the atmosphere and said end of said passageway to predetermine the rate of flow of air into and out of said end.

5. In a gauge for fluid, a pivotally mounted housing, means sensitive to fluctuation of the mean level of said fluid for turning said housing about the axis of its pivotal support, said housing having an arcuate passageway therein, a pair of conductors extending longitudinally of said passageway and spaced apart therein, a quantity of conductive fluid within said passageway and establishing movable electrical contact with both of said conductors, said quantity of fluid filling the associated portion of said passageway to make an hermetic seal with the walls thereof, a by-pass interconnecting opposite ends of said passageway, and means presenting a restricted orifice in said by-pass.

6. In a gauge for fluid, a housing having a reservoir therein with a passageway leading upwards therefrom, a pair of spaced apart conductors extending longitudinally of said passageway, an electrically conductive liquid within said reservoir, and means sensitive to fluctuation of the level of said fluid for forcing said liquid from said reservoir upwards into said passageway and thereby immersing a length of each of said conductors which is proportional to the extent of the motivating fluctuation in the level of said fluid, and a needle valve establishing communication between the top of said passageway and the atmosphere and regulable to determine the rate of flow of air into and out of said passageway.

7. In a guage for fluid, a pivotally mounted housing, means sensitive to fluctuation of the mean level of said fluid for turning said housing about the axis of its pivotal support, said housing having an arcuate passageway therein, a pair of conductors extending longitudinally of said passageway and spaced apart therein, a quantity of conductive fluid within said passageway and establishing movable electrical contact with both of said conductors, said quantity of fluid filling the associated portion of said passageway to make an hermetic seal with the walls thereof, a by-pass interconnecting opposite ends of said passageway, means presenting a restricted orifice in said by-pass, and adjustable means for controlling rate of flow through said orifice.

EARL E. BIDWELL.